United States Patent [19]

Thakur et al.

[11] Patent Number: 5,615,016

[45] Date of Patent: Mar. 25, 1997

[54] EXPOSURE SCHEME FOR MINIMIZING MICROBANDING INSLM-BASED PRINTERS

[75] Inventors: Vivek K. Thakur, Karnataka, India; Vadlamannati Venkateswar, Dallas, Tex.

[73] Assignee: Texas Instruments Incorporated, Dallas, Tex.

[21] Appl. No.: 334,650

[22] Filed: Nov. 4, 1994

[51] Int. Cl.$^6$ .................................................. H04N 1/034
[52] U.S. Cl. ............................................. 358/298; 347/240
[58] Field of Search ............................... 308/298, 503; 347/240, 251, 131, 239; 346/108, 106, 107 R

[56] References Cited

U.S. PATENT DOCUMENTS

| | | | |
|---|---|---|---|
| 4,074,319 | 2/1978 | Goldschmidt et al. | 358/230 |
| 4,622,560 | 11/1986 | Withoos et al. | 346/1.1 |
| 4,816,846 | 3/1989 | Kollartis | 346/157 |
| 5,455,602 | 10/1995 | Tew | 347/239 |
| 5,461,411 | 10/1995 | Florence et al. | 347/240 |

FOREIGN PATENT DOCUMENTS

| | | | |
|---|---|---|---|
| 0172592A1 | 2/1986 | European Pat. Off. | 346/1.1 |
| 0321143A3 | 6/1989 | European Pat. Off. | 346/157 |
| 0620676A1 | 10/1994 | European Pat. Off. | 347/240 |

*Primary Examiner*—Peter S. Wong
*Assistant Examiner*—Gregory J. Toatley, Jr.
*Attorney, Agent, or Firm*—Julie L. Reed; James C. Kesterson; Richard L. Donaldson

[57] ABSTRACT

An improved method for time delay and integration printing for gray scale. A gray scale represented by a bit pattern is provided for time delay and integration printing onto a photosensitive substrate. The pattern (12) is rotated about the light intensity cycle of the light source such that microbands in the final image are minimized or eliminated and sent to a spatial light modulator (10) for transfer to a printing substrate.

3 Claims, 1 Drawing Sheet

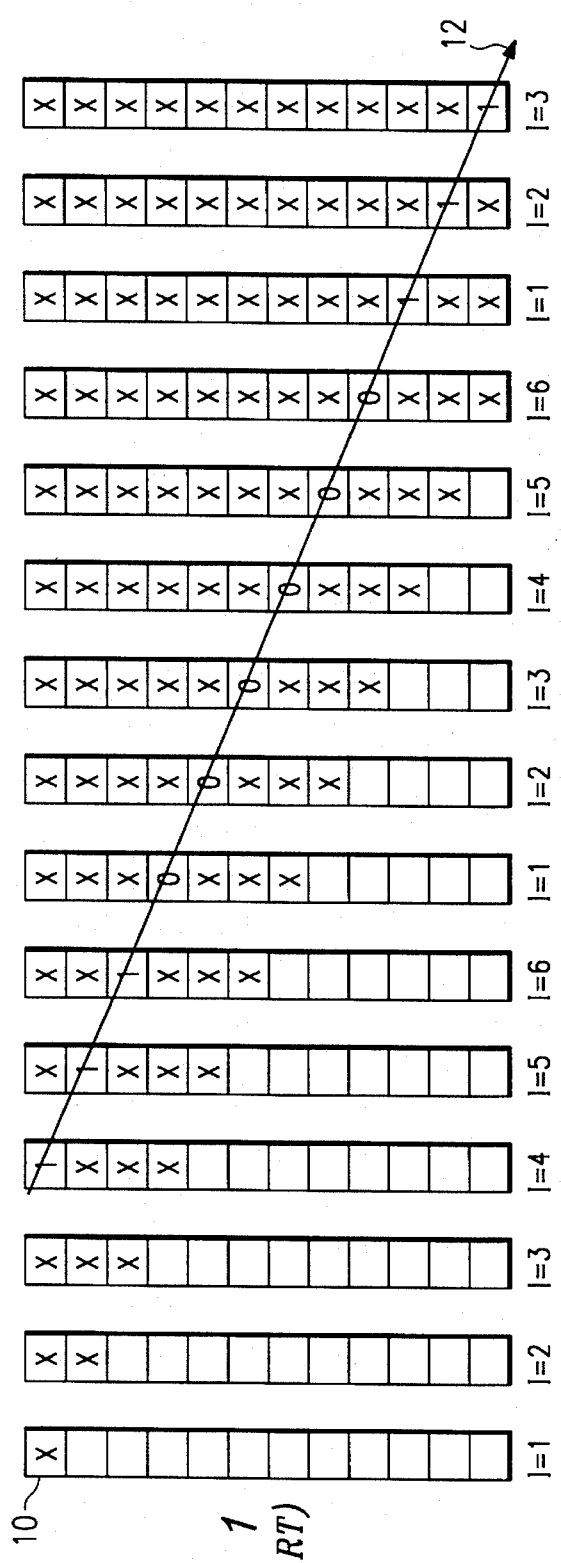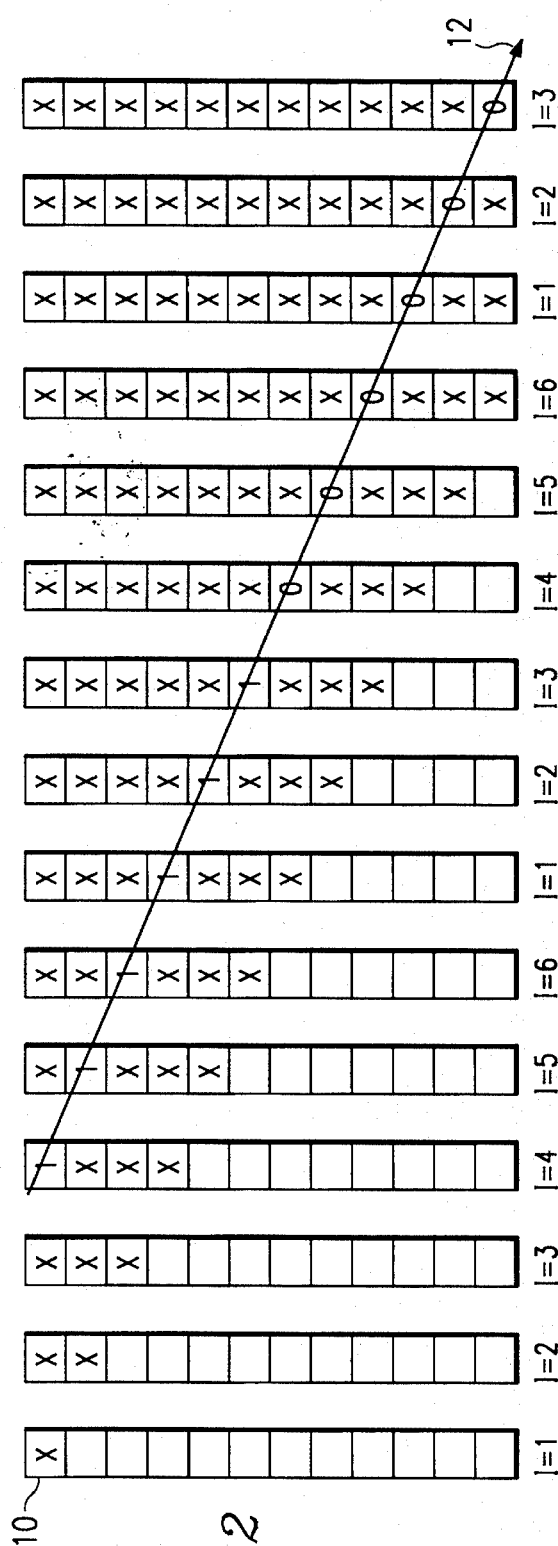
FIG. 1
(PRIOR ART)
FIG. 2

EXPOSURE SCHEME FOR MINIMIZING MICROBANDING INSLM-BASED PRINTERS

BACKGROUND OF THE INVENTION

1. Field of the Invention

This invention relates to printing, more particularly to eliminating artifacts in the printing process.

2. Background of the Invention

Electrophotographic (EP) printing appears in many different forms, from desk top printing to photographic development. EP printing typically involves a laser source and a spinning mirror, where the spinning mirror reflects the point laser source onto a photosensitive surface. As the mirror spins, the laser touches the surface at various points, line after line, forming an image on the surface. The surface moves relative to the source.

The surface becomes charged at the point where the light touches it. This charge can then be transferred to a substrate. In some cases, such as in printed circuit board manufacture, the photosensitive surface is merely a layer on the final substrate, in which case the surface and substrate are the same thing. The substrate (paper, film or plate) travels by a developing system which develops the latent image into a visible image. In a printer, the toner forms the image on the paper and is fused to the paper, making the image permanent.

Spatial light modulators can substitute for the spinning mirror. These modulators normally have arrays of individual elements, each representing a pixel in the final image, where either the ON or OFF elements transfer light to the surface. Whether the system transfers light by ON elements or OFF elements is determined before the system is designed. Spatial light modulators have the advantage over the laser and spinning mirror system in that they can perform time delay and integration (TDI) printing easily.

TDI printing involves coordinating the flow of data down the lines of the array with the movement of the photosensitive surface. For example, suppose a device had an array that had however many number of columns necessary to fill a page and sixteen rows. In the first exposure sequence, the first line would display data for line A on the photosensitive surface. In the second exposure sequence, the second line would have the data for line A, since line A on the surface moves as the surface moves. This process repeats until all 16 lines of the device have had an opportunity to expose the surface at line A.

For added control over gray scale, the light source can be modulated with several different power levels, or further phases of exposure can be chosen. A phase is created by using the movement of a photoreceptor relative to the spatial light modulator pixel to create four portions of the pixel's image, allowing spatial modulation within each pixel. Each portion is referred to as a phase. The selection of power levels and the number of lines of exposure for each pixel gives even finer control over gray scale, which will be referred to as time integration for gray scale, or TIG. U.S. patent application Ser. Nos. 08/038,398, "Process and Architecture for DMD Printer," and 08/038,391, "Gray Scale Printing Using Spatial Light Modulators," discuss this control.

The TIG approach involves a look-up table that specifies an exposure bit pattern for each level of gray scale. For simplicity assume that there is no phase modulation in the system, but only light intensity modulation. The discussion is easily generalized to the case where both are present. Assume the repeating intensity pattern is r rows long and there are a set number, n, some multiple of r, rows on the modulator. The look-up table specifies the exposure pattern to expose pixels as if every pixel were on the first row of the modulator. For all lines of data for rows other than the first row on the modulator, the pattern must be rotated left by I mod n, allowing alignment of the exposure pattern with the correct light intensity.

However, this approach results in bands every n lines. The exposures for a pixel are relatively spread out over time in this approach. The spread is different for each pixel position, but the relative spread is the same every n lines. If the data loading on the modulator is not perfectly synchronized to the motion of the drum, bands appear every n lines especially in areas with constant gray scale. Some method, therefore, is needed to allow implementation of TIG, minimizing the artifacts.

SUMMARY OF THE INVENTION

An improved process for time delay and integration printing is disclosed. It is an advantage of this invention that it minimizes the effects of microbanding. The data in a typical TIG process is rotated around the entire pattern for a given pixel to accommodate the time delay. Rotating the data around the light intensity cycle reduces visibility of microbands by reducing the period of microbanding to the length of the light intensity pattern, rather than the exposure pattern. This process is adaptable and can be adjusted for each different electrophotographic printing process.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 is a block diagram representation of the face of the modulator in a prior art implementation of TIG printing.

FIG. 2 is a block diagram representation of the face of a spatial light modulator using a technique to minimize microbanding.

DETAILED DESCRIPTION OF THE PREFERRED EMBODIMENTS

FIG. 1 shows a representation of one column on a face of a spatial light modulator 10 undergoing time delay and integration printing (TIG) for gray scale. The light intensities are merely numbered, not meaning to imply that the light has a power of 1 at light level 1, and that the light is 6 times more powerful at level 6. These light levels could be assigned such that level 1 is 100%, level 2 is 83%, level 3 is 67%, etc., or they could be any series of power settings at which the light could be set.

FIG. 1 assumes six levels of light. Starting at the beginning of the process, light level 1 impinges the entire modulator but data is only on row 0. Each intensity of the light cycle is on for a period of time referred to as a line time. The photosensitive surface moves relative to the surface of the device so light level (I=2) exposes a device with data on both rows 0 and 1. Since the line of interest to be exposed on the surface is line 3, the data on these lines is indicated as a "Don't care" (X). Intensity I=3 exposes a device with data on rows 0–2. The row on which this example relies will show data on row 3. The pattern to be illuminated and subsequently exposed on the surface for row 3 is as follows:

| | |
|---|---|
| Light level | 1 2 3 4 5 6 1 2 3 4 5 6 |
| Data value | 1 1 1 1 1 1 0 0 0 0 0 0. |

These values can be seen across the intensity cycle by looking at the arrow 12. This value is typically arrived at by a look-up table which receives the gray level to be achieved and returns the pattern necessary to achieve it. Because the look-up table is passive, it only gives back the pattern for that data line, not taking into account TIG effects on that pattern. Since the row on the device for which that data line is intended does not receive its first exposure until light level 4, the data as actually illuminated is:

| | |
|---|---|
| Light level | 4 5 6 1 2 3 4 5 6 1 2 3 |
| Data value | 1 1 1 0 0 0 0 0 0 1 1 1. |

The "missed" data at light levels 1, 2 and 3 rotates to the end of the 12-bit pattern and receives illumination at that point. The data in the column of each intensity cycle that does not expose line 3 on the substrate is again not of interest and has been marked "Don't care."

Spreading the data out over time can cause microbands. The ability of the system to make the second pattern to be an exact substitute for the second pattern depends upon perfect coordination between the data flow and the surface. Any lag in the surface movement, and the resultant image will have seams in it every nth line time, where n is the number of bits in the exposure pattern. In the above example, n=12.

A method to eliminate or minimize this effect is shown in FIG. 2. The gray scale pattern is the same as the previous one used in FIG. 1, However, this pattern is not rotated about itself, it is instead rotated about the light intensity cycle. The light intensity cycle is the initial pattern of light intensities that will be repeated. In this example, the light intensity cycle has 6 intensities and is repeated once for 12 total exposures.

The data for light levels 1, 2 and 3 is rotated about the light intensity cycle such that when the three ON bits receive illumination at levels 4, 5 and 6, the three ON bits that were at the beginning are inserted immediately at the end of the first light intensity cycle. Therefore, the data for levels 1, 2 and 3 that were previously missed are now illuminated immediately after the levels for 4, 5, and 6. The zeroes then start at levels 4, 5 and 6 and pick up levels 1, 2 and 3 at the end.

| | | |
|---|---|---|
| Original pattern: | Light level | 1 2 3 4 5 6 1 2 3 4 5 6 |
| | Data value | 1 1 1 1 1 1 0 0 0 0 0 0 |
| Pattern for line 4: | Light level | 1 2 3 4 5 6 1 2 3 4 5 6 1 2 3 |
| | Data value | X X X 1 1 1 0 0 0 0 0 0 1 1 1 |
| New Pattern for | Light level | 1 2 3 4 5 6 1 2 3 4 5 6 1 2 3 |

-continued

| | | |
|---|---|---|
| line 4: | Data value | X X X 1 1 1 1 1 1 0 0 0 0 0 0. |

The number of bits to be rotated depends upon the total number of exposures in the and the line number of the device on which the data will be displayed. In general, the method for determining this is to find N mod M, where N is the line number and M is the number of exposures in the pattern. The above example has 12 exposures in the pattern, and the line number is 3. Therefore, 3 bits need to be rotated at the end of the light intensity cycle. Since the example has a light intensity cycle of 6 intensities, 3 bits need to be rotated to the end of the original 6 bits in the pattern. Again, this pattern across the intensity cycle can be seen along arrow 12.

One large advantage of this process is its adaptability. Just as the bits can be rotated to prevent microbands in the above example, they can be rotated to adjust for certain characteristics of a specific EP process. The bits would typically be rotated by a simple processor or arithmetic logic unit (ALU), for example, as they return from the look up table to the process controller of the system. Also, the process controller could rotate them. Either way, adding a small amount of extra logic, or adjusting the rotation process of the bits could customize the rotation pattern for each EP process from system to system.

Thus, although there has been described to this point particular embodiments of an improved TDI printing process, it is not intended that such specific references be considered as limitations upon the scope of this invention except in-so-far as set forth in the following claims.

What is claimed is:

1. An improved method of printing comprising:
   a. determining a gray scale to be transferred to a photosensitive surface;
   b. illuminating a spatial light modulator with a light source, wherein said light source has a predetermined light intensity cycle;
   c. time delaying and integrating said pattern onto said photosensitive surface with a predetermined number of exposures; and
   d. rotating the bits of a given line number around said light intensity cycle such that the number of bits rotated depends upon said line number and said predetermined number of exposures.

2. An improved method of time delay and integration printing with light source modulation, where a gray scale is converted by a look up table to a bit pattern for illumination on a spatial light modulator, wherein said improvement comprises;
   rotating said bit pattern about said light source's light intensity cycle.

3. The method of claim 1 wherein said time delay and integration onto said photosensitive surface includes exposing said photosentive medium in phases.

* * * * *